United States Patent
Fuhrland et al.

(10) Patent No.: US 7,148,962 B2
(45) Date of Patent: Dec. 12, 2006

(54) DEVICE FOR DETERMINING THE POSITION AND DIRECTION OF CHANNEL INLETS AND CHANNEL OUTLETS IN SEWER MANHOLES

(76) Inventors: Matthias Fuhrland, Salvador-Allende-Strasse 28, D-39126 Magdeburg (DE); Michael Fuhrland, Saalbahnhofstrasse 28, D-07743 Jena (DE); Joerg Herrmann, Kunstanger 12, D-39218 Schoenebeck (DE)

( * ) Notice: Subject to any disclaimer, the term of this patent is extended or adjusted under 35 U.S.C. 154(b) by 214 days.

(21) Appl. No.: 10/512,369

(22) PCT Filed: Apr. 15, 2003

(86) PCT No.: PCT/DE03/01268

§ 371 (c)(1),
(2), (4) Date: Oct. 25, 2004

(87) PCT Pub. No.: WO03/091662

PCT Pub. Date: Nov. 6, 2003

(65) Prior Publication Data

US 2006/0055916 A1    Mar. 16, 2006

(30) Foreign Application Priority Data

Apr. 25, 2002   (DE) .................................. 102 18 441

(51) Int. Cl.
*G01N 21/00* (2006.01)

(52) U.S. Cl. .................................................. 356/241.1
(58) Field of Classification Search ............... 356/241.1
See application file for complete search history.

(56) References Cited

U.S. PATENT DOCUMENTS

| | | | |
|---|---|---|---|
| 4,441,812 A * | 4/1984 | Feist | 356/147 |
| 6,657,734 B1 * | 12/2003 | Monz et al. | 356/601 |
| 6,724,471 B1 * | 4/2004 | Feist et al. | 356/148 |

FOREIGN PATENT DOCUMENTS

| | | |
|---|---|---|
| DE | 1623111 | 6/1971 |
| DE | 33 40 317 A1 | 8/1984 |
| DE | 38 04 875 | 8/1989 |
| DE | 296 03 681 U1 | 5/1996 |
| DE | 197 11 995 A | 10/1997 |

* cited by examiner

*Primary Examiner*—Gregory Toatley, Jr.
*Assistant Examiner*—Isiaka O. Akanbi
(74) *Attorney, Agent, or Firm*—Collard & Roe, P.C.

(57) ABSTRACT

The invention relates to a device for determining the position and direction of channel inlets and channel outlets in wastewater systems that, in the horizontal plane, lead into and out of sewer manholes. To this end, a device was created that is provided in the form of a tachymeter attachment which uses a system of mirrors to enable the horizontal aiming beam of the tachymeter to be redirected to a variable depth in order to form a horizontal aiming beam that is parallel to the first. A profiled tube (11) that is attached via a frame (10) to assigned to the tachymeter (1) and reflectors are provided inside said profiled tube (11). The profiled tube is provided with a right angle and passes through the central support (7) equipped with a tubular extension (23), to which an extension consisting of individual tubes (15) that are joined to one another in a telescoping manner is assigned via a coupling (14), and the tachymeter (1), together with the profiled tube (11) and the central support (7), are mounted on the tripod (3) in a manner that enables them to rotate 360°.

7 Claims, 4 Drawing Sheets

Fig. 4
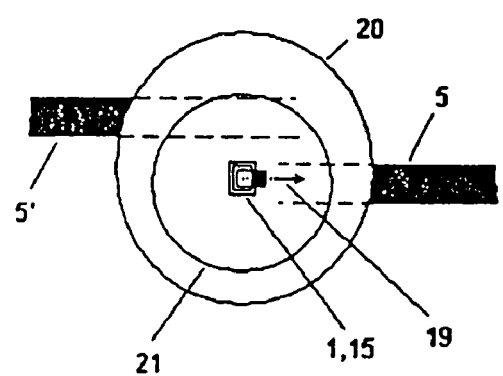
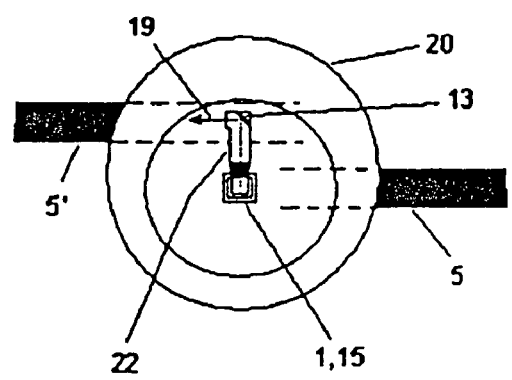

DEVICE FOR DETERMINING THE POSITION AND DIRECTION OF CHANNEL INLETS AND CHANNEL OUTLETS IN SEWER MANHOLES

BACKGROUND OF THE INVENTION

1. Field of the Invention

The invention relates to a device for determining the position and direction of sewage system channel inlets and channel outlets which lead into or out of sewer manholes in a horizontal plane.

2. The Prior Art

In practice, sewer manholes are not generally measured exactly since hitherto either no suitable systems have been available for providing information about the position and direction of the channels leading into and out of sewer manholes sewer manholes are sewage systems or it has been disproportionately difficult to determine horizontal directions of inlets are of channels branching off a manhole in a horizontal direction. For that reason, only the position and height of a sewer manhole cover are measured, and the approximate depth of the bottom of the sewer manhole and of the channel inlets and channel outlets are measured approximately with a yard stick or carpenter's gage.

This problem is dealt with by DE 33 40 317 A1 which describes a measuring device for simultaneously defining the position and height of points within cavities, especially in sewage systems, which are difficult to access. The disclosed measuring device consists of a prism staff with two reflective prisms mounted in corresponding frames. The length of the prism staff can be varied by plug-in connections of aluminum tubes of rectangular profile and different lengths and the staff can be rotated at the plug joints about its longitudinal axis. A point is arranged at the lower end of the staff for placing the staff upon the bottom of a sewer manhole or upon the bottom of a connecting channel. By measuring the horizontal angle, the vertical angle and the oblique distance to the two reflective mirrors on the prism staff, the position of the channel inlet can be calculated by mathematical methods. Its disadvantage resides in the fact that only the position of the channel inlet and channel outlet can be determined with the measuring device; but it is not possible to determine the direction of the channel into or out of the manhole.

DE 38 04 875 A1 discloses measuring and calibrating with electro-optical tachymeters in which a portable reflector of the tachymeter is mounted on a perpendicular staff. The length of the perpendicular staff may be changed steplessly. For measuring pipe conduit parts in construction trenches or shafts, the tip of the perpendicular staff is placed upon the point to be measured, and the perpendicular staff is precisely positioned vertically. The vertical positioning of the perpendicular staff is very complicated and to obtain a precise measurement, the perpendicular staff must be maintained motionless by its user for an extended period of time. For improving the manipulation of such a perpendicular staff, DE 197 11 995 A1 discloses a perpendicular staff at the handle and upper end of which there is provided a reflector of a tachymeter with a perpendicular staff holder extending at a right angle therefrom. The perpendicular staff holder consists of a perpendicular staff extension, a handle and a fastening device. The fastening device is structured as a clamp. A level slide is arranged on the extension of the perpendicular staff, which can be freely positioned and which is provided with a large level for readability even from a larger distance. While this arrangement improves the handling problem of the perpendicular staff, it is only the position, but not the direction, of channel inlets and outlets which can be determined by this perpendicular staff. It is, however, the planning measurements and conduit documentation which are required for preventing damage as a result of subsequent construction work.

Reference is also to be made to DE 296 03 681 U1 and DE-OS 1 623 111 which respectively disclose an optical plumb line for geodesic apparatus and a method and apparatus for measuring cavities, in particular subterranean caverns. These arrangements can also not measure the direction of channel inlets and outlets.

OBJECT OF THE INVENTION

It is, therefore, an object of the invention to provide a device for determining the position and direction of channel inlets and channel outlets in sewer manholes which may be positioned relative to a tachymeter and which avoids the disadvantages of known solutions for determining channel inlets and outlets.

SUMMARY OF THE INVENTION

In accordance with the invention, the object is accomplished by the elements of claim 1. Advantageous solutions and special embodiments of the device may be taken from the subclaims.

A device was thus produced which is structured as a tachymeter cowl and which makes it possible by a reflector system at a variable depth to deflect the horizontal homing beam of the tachymeter to a parallel horizontal homing beam. The device is structured such that while it is affixed to the tachymeter it is journaled for rotation about the vertical stand axis of the tachymeter. Moreover, the device is positioned relative to the tachymeter such that the horizontal axis of the device in accordance with the invention is aligned parallel to the horizontally adjusted homing axis of the tachymeter. This precise arrangement makes it possible to shift the field of view of an observer in the vertical direction. This is made possible by the fact that the device is made of a profile tube which leads into a hollow center console which is structured such that a tubular extension which is mounted in a vertically relative to the tachymeter, below the tripod on which the tachymeter and the device, in the direction of the sewer manhole to be measured and which extends into a profile tube extension structured as telescoping tubes mounted by a connector to the lower end of the center console. For changing the vertical length of the tube extension, the tubes may be extended or contracted.

In another aspect of the invention, the arrangement and structure of the device and the connection of the device to the tachymeter as well as its arrangement and attachment on the tripod make it possible to adjust the tachymeter by 360° relative to the associated device so that all horizontal channel inlets and channel outlets connected to a manhole may be measured.

The circumferential rotation or adjustability of the tachymeter is realized by a specific journal and support. The journal/support consists of a tripod known per se, a lower and an upper console and a middle console which is rotatably journaled therebetween. In the tripod which is rigidly connected to the stand the lower console is clamping and can in turn be connected to the upper console by a latch. The tachymeter is seated on the upper console and because of its structure it is arranged rotatably relative thereto.

The profile tube of the device in accordance with the invention is connected to the tachymeter by a frame; on the other hand a horizontally extending part of the profile tube extends through a recess in the middle console the tubular vertical extension of which penetrates through the center opening of the tripod and of the stand and at the lower end of which there is provided the connection for the extension of the profile tube (telescope). The arrangement and mounting of the profile tube with respect to the middle console is a positive or frictional one to ensure that when the tachymeter is adjusted in a circumferential direction the device for defining the position and direction is also rotated or pivoted.

A further essential characteristic of the invention is that the profile tube performs a dual function, i.e. the attachment of the entire device relative to the tachymeter and the housing within the interior of the profile tube of reflectors for deflecting the homing beam of the tachymeter in the entire system. To this end, the profile tube, in the area of the sighting telescope of the tachymeter, is provided with an opening so that the homing beam emitted from the tachymeter may penetrate into, and extend through the system of the measuring device. A second opening in the profile tube is provided in the area of standing axis of the tachymeter where the homing beam is deflected vertically downward into the middle console positioned thereunder and its tubular extension. A reflector is rigidly mounted in the lowest tube for deflecting the homing beam back into a horizontal direction for exiting through a lateral opening in the device in accordance with the invention in a direction disposed parallel to the horizontally positioned homing axis of the tachymeter.

In accordance with the invention the individual tubes forming the vertical extension of the profile tube can be extended and retracted by a drive unit in the manner of a telescope. The limited field of view resulting from the cross-sections of the individual tubes may be enlarged by an optical system at the telescope end of the smallest tube. A light source at the end of the tube significantly improves the viewing conditions.

Advantageously, the device for determining the position and direction of channel inlets and channel outlets is provided with a control device for actuating the telescope drive for extending or retracting the individual tubes. To this end, there is provided a D.C. motor and a toothed belt drive connected therewith. The D.C. motor is mounted on the upper tube and the individual toothed belts are adhesively fastened to the individual tubes. A worm gear transmission transmits the rotation to the toothed belts by a toothed wheel for vertically sliding them.

Moreover, in accordance with the invention, an eccentric cam is associated with the innermost and smallest tube at the end thereof, which is of a fixed length or, in a preferred embodiment, of variable length. The length of the eccentric cam may be varied by joined and telescopingly arranged tubes.

The device in accordance with the invention ensures a view in all rotational directions in a sewer manhole. Inlets and outlets may be rendered visible in the horizontally positioned sighting telescope of the tachymeter. The depth may be read from the length of the telescope, and together with the height of the position of the tachymeter or the leveled height of the cover of the sewer manhole and the height of the instrument there results, in the selected height relation system, the height of the channel input or channel output. At the same time, the horizontal direction may be read or measured at the tachymeter. An exact determination of the horizontal direction of the channels is thus possible in the case where the channel extension is directed directly towards the standing axis of the tachymeter. Where this is not the case, the exact horizontal direction of the channel, without shifting the tachymeter, can only be determined by an eccentric measurement. That is to say, the end of the tube would have to be displaced away from the standing axis into the channel extension.

In accordance with the invention, this is accomplished by an eccentric cam provided at the end of the extended tube. A reflector or mirror rigidly mounted in the eccentric cam horizontally deflects the homing beam which, depending upon the way the cam is mounted, takes place to the left or to the right by 90°. Direction and size of the deflection are taken into consideration when calculating the horizontal direction of a given channel.

In a preferred embodiment, the eccentric cam is structured telescopingly to make it possible variably to set the length of the eccentric cam so that the direction and length of displaced channel inlets and channel outlets may be determined.

DESCRIPTION OF THE SEVERAL DRAWINGS

The novel features which are considered to be characteristic of the invention are set forth with particularity in the appended claims. The invention itself, however, in respect of its structure, construction and lay-out as well as manufacturing techniques, together with other objects and advantages thereof, will be best understood from the following description of preferred embodiments when read in connection with the appended drawings, in which:

FIG. 4 are schematic presentation of the arrangement of eccentric cams for an eccentric measurement.

DETAILED DESCRIPTION OF THE PREFERRED EMBODIMENTS

Figure 1:
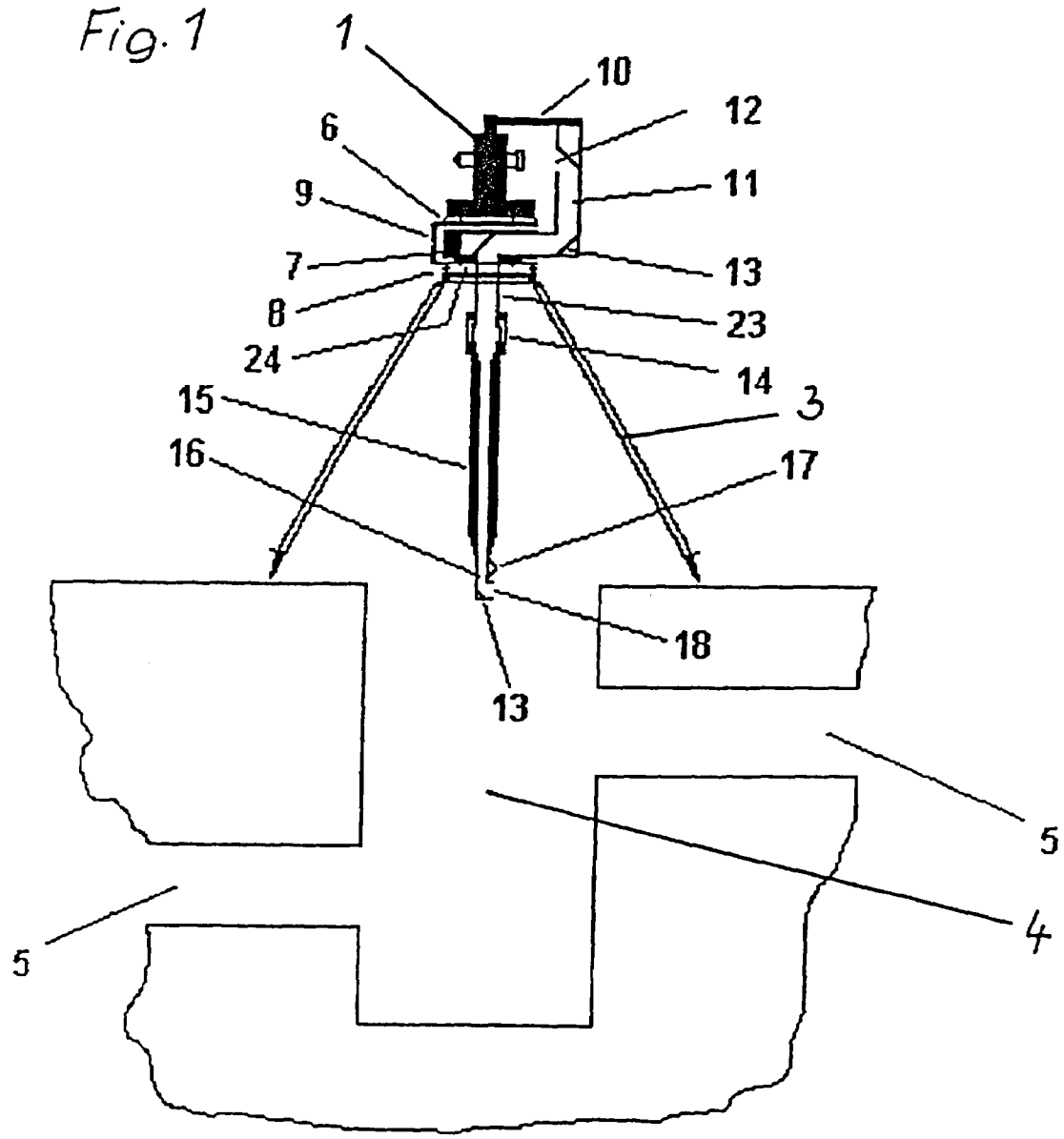
FIG. 1 depicts the device associated with a tachymeter and a stand positioned above a sewer manhole.

The structure and arrangement of the device relative to a tachymeter 1 as well as the arrangement and mounting of the tachymeter 1 and the device relative to a stand 3 positioned over a sewer manhole 4 may be directly seen from the overall presentation of FIG. 1. The stand 3 constitutes a support for the individual functional elements of the device and of the tachymeter 1 which are mounted relative to each other in or on the stand 3 such that a complete horizontal view in the sewer manhole 4 is possible in all circumferential directions. A tripod 8 is rigidly mounted on the stand 3 and supports a lower console 24, a middle console 7 and an upper console 6. The tachymeter 1 is rotatably mounted on the upper console 6. The device in accordance with the invention is arranged and positioned relative to the tachymeter 1 and to the middle console 7. This is accomplished by a frame 10 provided with a profile tube 11 which preferably is of square cross-section and structured such that it can be received through a recess in the middle console 7 and which, furthermore, is structured to have an opening directed downwardly and disposed coaxially with respect to the standing axis of the tachymeter 1. A reflector is positioned above the opening. The middle console 7 positioned below the upper console 6 is provided with a tubular downward extension 23 penetrating through the center of the tripod 8 and of the stand 3. Below the tubular extension 23 of the middle console 7 there is mounted, by way of a connector 14, an extension formed of individual telescopingly connected tubes 15.

The profile tube 11 is formed by individual plug-connected partial pieces so that the profile tube 11 may be easily assembled and disassembled. The profile tube 11 is provided with an opening 12 coaxial with the horizontal axis of the sighting telescope 2 of the tachymeter 1. Within the profile tube 11 at the deflection points, there are provided reflectors 13, preferably structured as mirrors, such that an unimpeded view through the system is possible.

The structure of the telescopingly arranged tubes 15 is selected such that the smallest tube 16 is provided at its end with an exit opening 18 disposed at an angle of 90° relative to the standing axis of the tachymeter 1. Also, a light source 17 is disposed at the end of the tube 16, and a reflector 13 is provided in the area of its angled section.

The circumferential rotation and unimpeded adjustment of the tachymeter 1 and the associated device is made possible by the middle console 7 which is rotatably mounted between the lower console 24 and the upper console 6. This, in turn, is made possible by the lower console 24 and the upper console 6 being rigidly connected to each other by a latch 9 so that the middle console 7 including the tachymeter 1 and associated profile tube 11 may be rotated. The rotational movement is not impeded by the latch 9 as it may be moved to a second latching position if required.

Figure 2:
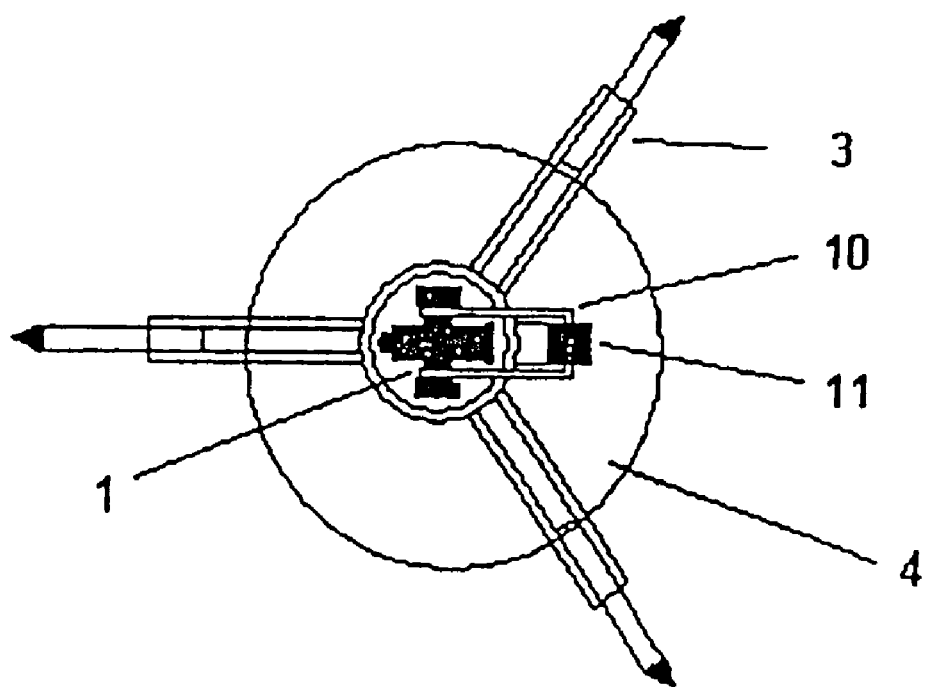
FIG. 2 is a top elevation of FIG. 1.

Since the tubular extension 23 of the middle console 7 extends through the center of the stand 3 and since the profile tube 11 is arranged above the stand 3 relative to the tachymeter 1, the feet of the stand 3, as shown in FIG. 2, do not impede or hinder the 360° rotation of the tachymeter 1.

Figure 3:
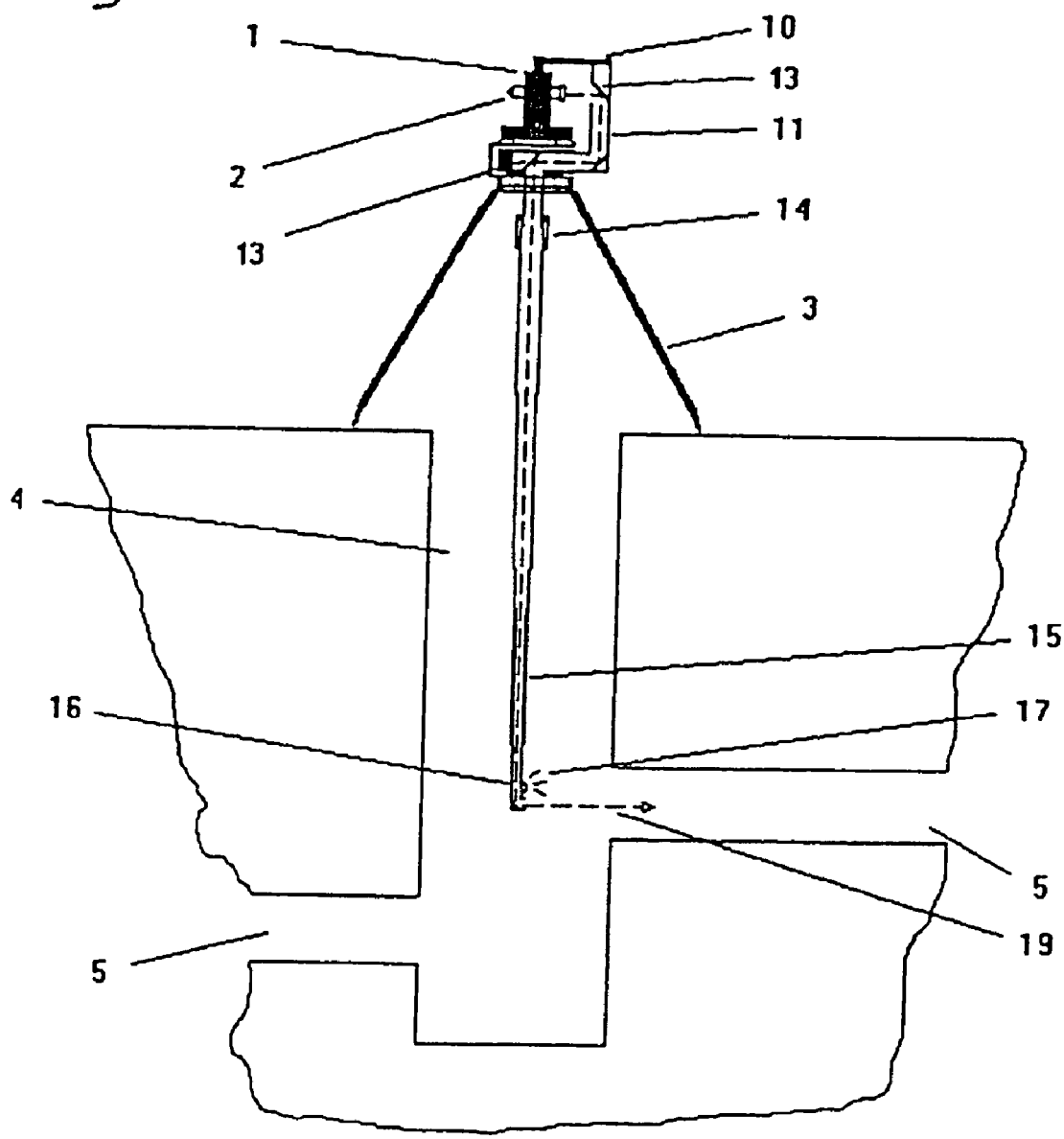
FIG. 3 depicts the device in an operating position with extended tubes.

The presentation of FIG. 3 makes clear the operating position of the tachymeter 1 and the device associated therewith. The individual tubes 15 are shown in their extended state and penetrate into the sewer manhole 4 and there position is disposed relative to a first channel outlet or channel inlet 5. The presentation makes it clear how the structure and arrangement of the profile tube 11 causes the field of view of an observer looking into the sighting telescope 2 of the tachymeter 1 to be vertically directed towards the opening 18 of the tube. The rotational adjustment of the tachymeter 1 is carried out by hand. The vertical extension and retraction of the individual tubes 15 is controlled by a D.C. motor with an associated toothed belt drive. It will be understood that other drives and transmission may also be used. The D.C. motor used in this embodiment is affixed to the upper tube 15 and is operatively connected to the toothed belt drive. A toothed belt is adhesively attached to each tube 15, and a worm gear transmits the rotation of the D.C. motor to the given toothed belt by means of a toothed wheel. By reversing the polarity of the motor its rotation may be reversed. A stopper at the telescoping tubes 15 ensures that extending the tubes 15 commences with the smallest or innermost tube 16 and that it continues with the next larger tube. The drive and the stopper are suspended at opposite sides of the tubes 15 and are connected by a counter pressure spring providing the required engagement pressure at each tube 15 during extension and retraction.

The presentations of FIG. 4 explain the principle of eccentric measurement of channels leading into and out of the sewer manhole 4. The channels 5 which are displaced relative to each other are shown in their position relative to the wall 20 of the manhole, and the tachymeter 1 is shown with the tubes 15 in the center of the opening 21 of the sewer manhole.

The left drawing of FIG. 4 shows that only the direction of the channel inlet or outlet can be measured in an orderly fashion. It is not possible precisely to determine the direction of the channel inlet and channel outlet 5'.

In order to make such a determination possible, an eccentric cam 22 is associated with the end piece of the tube 16. The cam 22 is provided with an opening disposed at a 90° angle relative to the axis of the axis of the cam 22 and providing for a view in the direction 19 of the channel outlet or input 5'. Advantageously, the eccentric cam 22 is also telescopingly mounted so that changes in distance or length in and relative to individual channel outlets and channel inlets 5' may be determined.

In a structure and arrangement of an eccentric cam 22 of fixed length as shown in the right portion of FIG. 4, the cam 22 is clamped against the tube 16 by a rubber roller. A counter weight at the side of the rubber roller balances the unilaterally acting tilting moment resulting from the mass of the eccentric cam 22. Downward tilting of the eccentric cam 22 is prevented by a cross-connection with the tube. The reflector 13 rigidly mounted on the eccentric cam 22 deflects the homing beam by 90° in a direction depending from the mounting of the eccentric cam 22. The direction and size of the deflection must be taken into consideration when calculating the horizontal direction of a given channel 5; 5'. An upward and downward deflection is conceivable and possible. When using an eccentric cam 22 of variably adjustable length, it is mounted on the tube 16 in an analogous manner. The vertical torque resulting as a function of the extended length is balanced by counterweights. Shifting of the counter weights is coupled to the movement extension of the individual tubes of the eccentric cam 22. Actuation and, thus, initiation of the function of the tubes is also carried out automatically.

In addition to the vertical shifting by the sighting telescope 2 of the tachymeter 1 of the field of view of a viewer relative to a given opening 18 of the tube 16 or opening of the eccentric cam 22 a laser emitted from the tachymeter 1 may be deflected and aimed at the position to be measured. That is to say, if deflected by a reflector system of the invention, a laser could be used for measuring distances so that in connection with a determination of the height and horizontal direction, the three-dimensional position of a reflective point in the channel 5 could also be determined.

What is claimed is:

1. A device for determining the position and direction of channel inlets and channel outlets in sewer manholes which lead into and extend from them in a horizontal or slightly inclined plane, characterized by the fact that a profile tube (11) mounted by a frame (10) is associated with a tachymeter (1), with reflectors (13) provided in the interior of the profile tube (11);

the profile tube (11) is structured rectangularly and penetrates through a recess in, and is rotatably mounted on, the middle console (7);

the middle console (7) is provided with a tubular extension (23) the axis of which coincides with the stand axis or vertical axis of the tachymeter (1) and which by way of a connector is associated with an extension consisting of individual telescopingly connected tubes (15); and the tachymeter (1) with the profile tube (11) and the middle console (7) is arranged on the stand (3) for 360° rotation between the lower console clamped to the tripod (8) and an upper console (24) rigidly connected to each other by a latch (9).

2. The device in accordance with claim 1, characterized by the fact that the profile tube (11) is structured to be of square cross-section and consists of individual partial pieces which may be connected by a plug-in connection and is provided with an opening (12) disposed in the axial and viewing direction of the sighting telescope (2) from the tachymeter (1).

3. The device in accordance with claim 2, characterized by the fact that the individual tubes (15) are connected relative to each other in a telescoping manner and are provided with a control and a connected drive consisting of a D.C. motor and a toothed belt, the drive unit being arranged at the outer tube (15) and the individual tube (15) being provided with toothed belts.

4. The device in accordance with claim 3, characterized by the fact that at its end the smallest innermost tube (16) is provided with a reflector (13) and an exit opening (18) the axis of which is disposed at a right angle to the viewing and stand axis of the tachymeter (1) and, hence, in the viewing direction (19) and that at its end the tube (16) is also provided with a light source (17).

5. The device in accordance with claim 4, characterized by the fact that an eccentric cam (22) is associated with the lower tube (16) and positionable relative to the exit opening (18) thereof for eccentric measurement by an internal reflector (13).

6. The device in accordance with claim 5, characterized by the fact that the eccentric cam (22) is structured to be of fixed or variable length, the variability of the length of the eccentric cam (22) being provided by telescopingly connected and movable partial pieces formed as tubes.

7. The device in accordance with claim 6, characterized by the fact that in the viewing direction of an observer the field of view from the tachymeter (1) is shifted by reflectors (13) parallel to the exit opening (18) of the tube (16) and that a laser is also used for the measurement.

* * * * *